No. 843,255. PATENTED FEB. 5, 1907.
J. P. BLAKEMAN.
AUTOMATIC BRAKE.
APPLICATION FILED APR. 30, 1906.
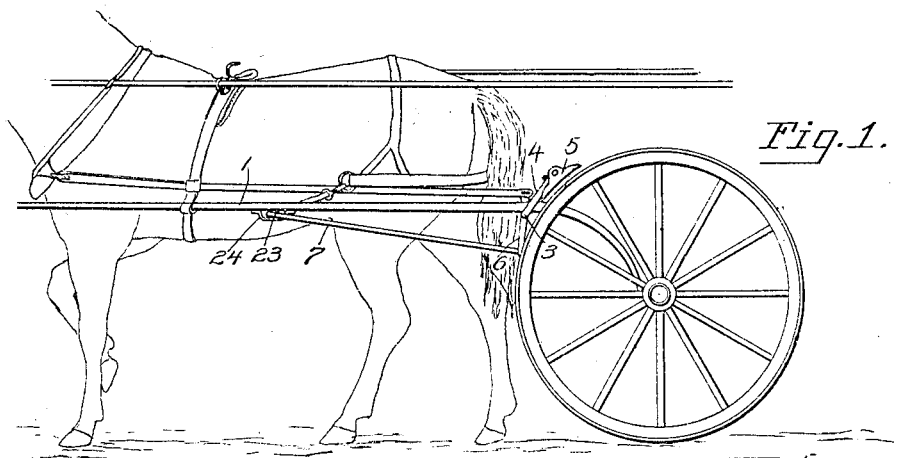
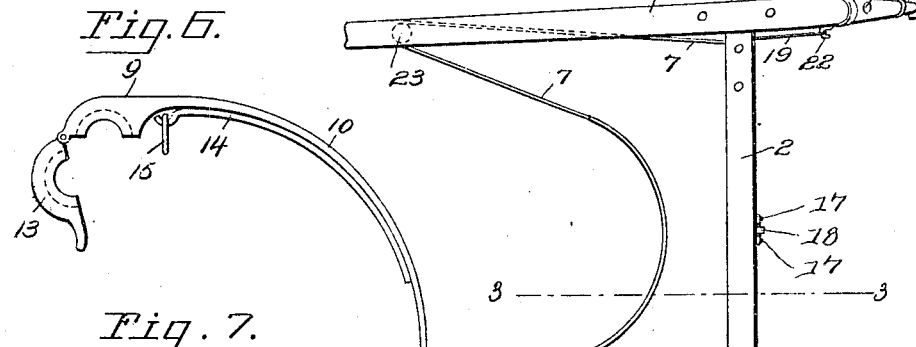
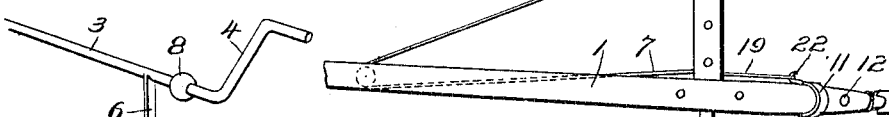
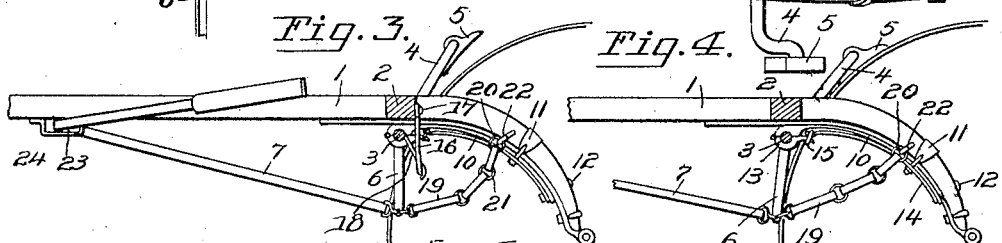
John P. Blakeman,
INVENTOR.
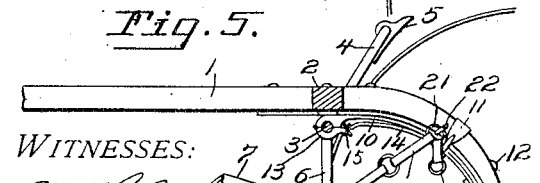
WITNESSES:
ATTORNEYS

UNITED STATES PATENT OFFICE.

JOHN P. BLAKEMAN, OF CHAPLIN, KENTUCKY.

AUTOMATIC BRAKE.

No. 843,255.          Specification of Letters Patent.          Patented Feb. 5, 1907.

Application filed April 30, 1906. Serial No. 314,539.

*To all whom it may concern:*

Be it known that I, JOHN P. BLAKEMAN, a citizen of the United States, residing at Chaplin, in the county of Nelson and State of Kentucky, have invented new and useful Automatic Brakes for Vehicles, of which the following is a specification.

The present invention relates to a brake for horse-drawn vehicles of that type in which the brake-shoes are in "off" position when the vehicle is traveling on the level or upgrade and are automatically set when traveling downgrade and the vehicle tends to move faster than the horse.

The invention has for one of its objects to provide a brake mechanism of this character which is simple and inexpensive to construct and to apply to vehicles in ordinary use.

A further object of the invention is to so construct the brake mechanism that when applied it is of pleasing appearance; and a further object is to so arrange the brake-shoes with reference to the shafts of the vehicle that when they are automatically set they relieve the horse of the weight of the shafts, and more especially of the pressure required to set the shoes. This latter feature is an important factor, since the horse is capable of holding back a much larger load while descending a hill than with other constructions, and at the same time chafing produced by the harness and more serious resulting injuries are avoided.

With these objects in view the invention consists of the various details of construction and arrangements of parts, as will be more fully described hereinafter and finally set forth in the claims appended hereto.

In the accompanying drawings, which illustrate one embodiment of the invention, Figure 1 is a side view showing my automatic brake mechanism applied to a vehicle. Fig. 2 is a plan view of the mechanism. Fig. 3 is a longitudinal section thereof, taken on line 3 3, Fig. 2, showing the brake-shoes in normal position. Figs. 4 and 5 are similar views showing the brake mechanism, respectively, in its operative position, as when traveling downhill, and in an inoperative position, as when backing the vehicle. Fig. 6 is an enlarged detail view of the arrangement for supporting the shoe-carrying shaft of the mechanism. Fig. 7 is a perspective view of one end of the shaft.

Referring to the drawings, 1 represents the shafts on the vehicle, which are of usual construction and attached at their rear ends to the front axle and braced by the cross-piece 2. Located under the cross-piece is a shaft 3, having at its outer ends and disposed outside the shafts the upwardly and rearwardly extending crank-arms 4, to which are secured the brake-shoes 5, disposed over the tires of the front wheels. The wheels may be shod with steel or rubber tires, as desired, since my brake mechanism is suitable for either kind.

Arranged inwardly from each of the shafts 1 are depending crank-arms 6 on the transverse shaft 3, to which the rear ends of the backing-straps 7 of the harness are attached. The front ends of the backing-straps 7 are connected to the breeching of the harness in the usual manner, so that when stress is brought to bear on the straps by reason of the vehicle going downhill the crank-arms 6 are moved forwardly, so as to apply the brakes.

The shaft 3 is formed at each end at a point between the crank-arms 4 and 6 with the spherical journal 8, which is seated in a bearing 9 on the under side of each shaft 1. This bearing comprises a stationary member or steel structure 10, secured in place by the clip 11 and bolt 12, and hinged thereto is the bearing member 13, each member having a recess to receive the spherical journal 8. The hinge member 13 is held in position by means of a leaf-spring 14, anchored at one end by the bolt 12 and connected at its other end to the member 13 by a link 15. The spring 14 is of sufficient strength to always maintain the member 13 of the bearing in working relation to the enlargement 8 and to the other member 10, so that there will be no loose play between the parts, and hence noise or rattling will be prevented.

In order to hold the brake-shoes in off position, a U-shaped spring 16 is employed, that is secured at its ends to the cross-bar 2 by screws 17 and engages the outer end of an arm 18 on the cross-shaft 3, Figs. 2 and 3. It is also necessary to maintain the brake-shoes in off position when it is desired to back the vehicle. For this purpose the depending crank-arms 6 are each provided with a strap 19, having two or more rings 20 and 21, adapted to be engaged in a hook 22 on each shaft 1 for strapping back the arms 6, so that the stress brought to bear on the backing-straps will not set the brake-shoes. Fig. 5 shows the parts in this position. During normal operation the rings 20 engage the hooks, as shown in Fig. 3, the length of the strap being sufficient so as not to interfere with the operation of the device. When it is desired to back the vehicle, it is merely necessary to reach out over the dash and to hook up the rings 21, which is a simple and easy operation. After the backing is completed the rings 21 are unhooked and the rings 20 hooked in place. In order to reduce the friction to a minimum, the backing-straps 7 pass around rollers 23, arranged on the shafts 1 and mounted in the brackets 24, bolted or otherwise secured to the shafts. At each end of the rollers is a leather washer for diminishing the noise which would otherwise be produced.

The operation is as follows: Assuming the vehicle to be traveling over a level road or uphill, the parts then occupy the position shown in Fig. 3. When a downgrade is encountered, the vehicle tends to move by reason of its own weight faster than the horse. This draws the breeching of the harness and backing-straps taut and exerts a pull on the crank-arms 6, so that the brake-shoes are set and engage the tires of the wheel, as shown in Fig. 4.

It is to be noted that the brake-shoes are disposed above the shafts 1 and over the front wheels of the vehicle. Hence when the brake-shoes are set the effect is to take the weight of the shafts, as well as the pressure exerted by them, off the back of the horse, thus enabling the latter to sustain a very heavy load while going down an incline. When reaching the base of an incline and passing onto a level stretch or an upgrade, the brake-shoes immediately disengage the wheels and move to their off position, this being accomplished without any attention on the part of the driver. If it should be desired to back the vehicle, the rings 21 are hooked up before the horse is backed, so that the backing-straps have no effect upon the brake and the vehicle can be easily moved. To move forward again, the rings 21 are unhooked, so as to permit the parts to assume a normal position. The hooking and unhooking of the rings is the only work required on the part of the driver with my automatic brake.

What I claim as new, and desire to secure by Letters Patent, is—

1. In an automatic brake for horse-drawn vehicles, the combination of a set of shafts, a cross-shaft arranged adjacent the cross-bar of said set of shafts, upwardly-extending arms on the ends of the cross-shaft, brake-shoes mounted on the ends of said arms, depending arms extending below the cross-bar and cross-shaft which are adapted to be connected to the backing-straps of the harness, a member extending from the cross-shaft, and a spring on the cross-bar engaging the said member for holding the brake-shoes normally out of engagement with the front wheels of the vehicle.

2. In an automatic brake for horse-drawn vehicles, the combination of a set of shafts, a transverse rock-shaft thereon, a spherical journal at each end of the said shaft, a bearing for each of said journals mounted on the said set of shafts and provided with a recess for receiving the journals, said bearings comprising a stationary member bolted to the shafts, and a movable member hinged thereto, a leaf-spring for each of the movable members of the bearing, a link connecting the spring with the member, brake-shoes on the rock-shaft, and means for actuating the brake-shoes.

3. In a device of the character described, a set of shafts, a shoe-carrying shaft mounted thereon, crank-arms on the said shaft which are adapted to be connected with the backing-straps of the harness, hooks on the shafts at the rear ends of the latter and within reach of the driver from the vehicle-body, straps attached to the arms, and rings spaced apart on the straps and carried thereby which are adapted to be connected with the hooks in such a manner as to prevent the brakes from becoming set when the vehicle is moved backward and to hold the straps loose during the forward movement of the vehicle.

In testimony that I claim the foregoing as my own I have hereto affixed my signature in the presence of two witnesses.

JOHN P. BLAKEMAN.

Witnesses:
HENRY W. BEDFORD,
C. H. HUNGARLAND,